(12) United States Patent
Prodan et al.

(10) Patent No.: US 10,152,308 B2
(45) Date of Patent: Dec. 11, 2018

(54) USER INTERFACE DISPLAY TESTING SYSTEM

(71) Applicant: Microsoft Technology Licensing, LLC, Redmond, WA (US)

(72) Inventors: Alexandru Prodan, Redmond, WA (US); Jesse S. Bangs, Fergus Falls, MN (US); Leo A. Dignan, Horace, ND (US); David S. Froslie, Dilworth, MN (US); Simon K. Ejsing, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/701,632

(22) Filed: May 1, 2015

(65) Prior Publication Data
US 2016/0154729 A1   Jun. 2, 2016

Related U.S. Application Data

(60) Provisional application No. 62/086,130, filed on Dec. 1, 2014.

(51) Int. Cl.
| | |
|---|---|
| *G06F 9/45* | (2006.01) |
| *G06F 9/54* | (2006.01) |
| *G06F 11/36* | (2006.01) |
| *G06F 8/41* | (2018.01) |

(52) U.S. Cl.
CPC ............... *G06F 8/437* (2013.01); *G06F 9/54* (2013.01); *G06F 11/3684* (2013.01)

(58) Field of Classification Search
CPC .. G06F 11/36; G06F 11/3604; G06F 11/3608; G06F 11/3668; G06F 11/3672; G06F 11/3684; G06F 8/437; G06F 8/40–8/51
See application file for complete search history.

(56) References Cited

U.S. PATENT DOCUMENTS

| | | | |
|---|---|---|---|
| 8,151,276 B2 * | 4/2012 | Grechanik | G06F 8/38 717/124 |
| 9,141,518 B2 * | 9/2015 | Bharadwaj | G06F 11/3676 |
| 2004/0268307 A1 | 12/2004 | Plesko et al. | |
| 2006/0100975 A1 | 5/2006 | McMaster et al. | |

(Continued)

OTHER PUBLICATIONS

Wikipedia. "Strong and weak typing". Apr. 25, 2015, Wikipedia. Article identifier 659102115. Retrieved by the Examiner from https://en.wikipedia.org/w/index.php?title=Strong_and_weak_typing &oldid=659102115 on Oct. 19, 2016. pp. 1-4.*

(Continued)

*Primary Examiner* — Emerson C Puente
*Assistant Examiner* — Erika Kretzmer
(74) *Attorney, Agent, or Firm* — Christopher R. Christenson; Kelly, Holt & Christenson, PLLC

(57) ABSTRACT

A test interface generator accesses metadata defining a user interface display. The test interface generator generates a strongly typed application programming interface (API) for the user interface display, during compile time, based on the metadata defining the user interface display. A static type checker performs a static type check of each API during compilation of the application. A test system programmatically interacts with the user interface display through the strongly typed API.

17 Claims, 8 Drawing Sheets

(56) References Cited

U.S. PATENT DOCUMENTS

| | | | |
|---|---|---|---|
| 2006/0101392 A1 | 5/2006 | Isaza | |
| 2009/0217303 A1* | 8/2009 | Grechanik | G06F 8/38 |
| | | | 719/320 |
| 2010/0146420 A1* | 6/2010 | Bharadwaj | G06F 11/3676 |
| | | | 715/764 |
| 2012/0173998 A1 | 7/2012 | Chaturvedi et al. | |
| 2013/0086552 A1 | 4/2013 | Whitney et al. | |
| 2014/0068557 A1 | 3/2014 | Vanags et al. | |

OTHER PUBLICATIONS

Aho, A., R. Sethi, and J. Ullman. "Compilers: Principles, Techniques, and Tools". Mar. 1988. Addison-Wesley Publishing Company. Chapter 1, pp. 1-15.*

International Search Report and Written Opinion for International Patent Application No. PCT/US2015/062049, dated Feb. 5, 2016, date of filing: Nov. 23, 2015, 14 pages.

Chen Fu et al,: "Inferring Types of References to GUI Objects in Test Scripts", Software Testing Verification and Validation, 2009, ICST '09, International Conference on, IEEE, Apr. 1, 2009, 10 pages.

Vanags, et al., "Strongly typed metadata access in object oriented programming languages with reflection support", In Baltic Journal of Modern Computing, vol. 1, Oct. 22, 2013, 24 pages.

Vatsa, Abhimanyu Kumar, "Strongly Typed Views in MVC", In Microsoft Technology Journals, Dec. 23, 2012, 4 pages.

Kerne, et al., "Meta-Metadata: A Metadata Semantics Language for Collection Representation Applications", IIn Proceedings of the 19th ACM International Conference on Information and Knowledge Management. Oct. 26, 2010, 10 pages.

Shah, Deep, "How to generate strongly typed C# client for ASP.net Web API", Published on: Jul. 31, 2014, Available at: http://www.gitshah.com/2014/07/how-to-generate-strongly-typed-c-client.html.

"Strongly typed routing for Microsoft MVC4". Published on: Mar. 14, 2013, Available at: https://dysphoria.net/2013/03/14/strongly-typed-action-references-in-microsoft-mvc4/.

Syme, et al., "Strongly-Typed Language Support for Internet-Scale Information Sources", In Technical Report MSR-TR-2012-101, Sep. 2012, 57 pages.

"Generating Strongly Typed DataSets", Published on: Oct. 7, 2011, Available at: http://msdn.microsoft.com/en-us/library/wha85tzb(v=vs.110).aspx.

Mathur, Abhinav, "Meta-Metadata: An Information Semantics Language and Software Architecture for Collection Visualization Applications", A Thesis on Master of Science, Dec. 2009, 104 pages.

* cited by examiner

USER INTERFACE DISPLAY TESTING SYSTEM

CROSS-REFERENCE TO RELATED APPLICATION

The present application is based on and claims the benefit of U.S. provisional patent application Ser. No. 62/086,130 filed Dec. 1, 2014, the content of which is hereby incorporated by reference in its entirety.

BACKGROUND

Computer systems are currently in wide use. Some computer systems generate user interface displays with user input mechanisms. A user can interact with the user input mechanisms in order to control and manipulate the computer system.

Some test systems can be used to generate automated tests for computer systems. The automated tests programmatically interact with user interface components (such as controls and other user interface components) through an application programming interface that is exposed by the system being tested. The application programming interface is often a generic interface that is generated based on a variety of different accessibility interfaces that can be implemented on the user interface components. The generic application programming interface is normally weakly typed so that static type checking, during compile time, is not performed. These kinds of weakly typed application programming interfaces can be difficult to discover in the computing system.

The discussion above is merely provided for general background information and is not intended to be used as an aid in determining the scope of the claimed subject matter.

SUMMARY

An interface generator accesses metadata defining a user interface display. The interface generator generates a strongly typed application programming interface for the user interface display, during compile time. A test system or other system programmatically interacts with the user interface display through the strongly typed application programming interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
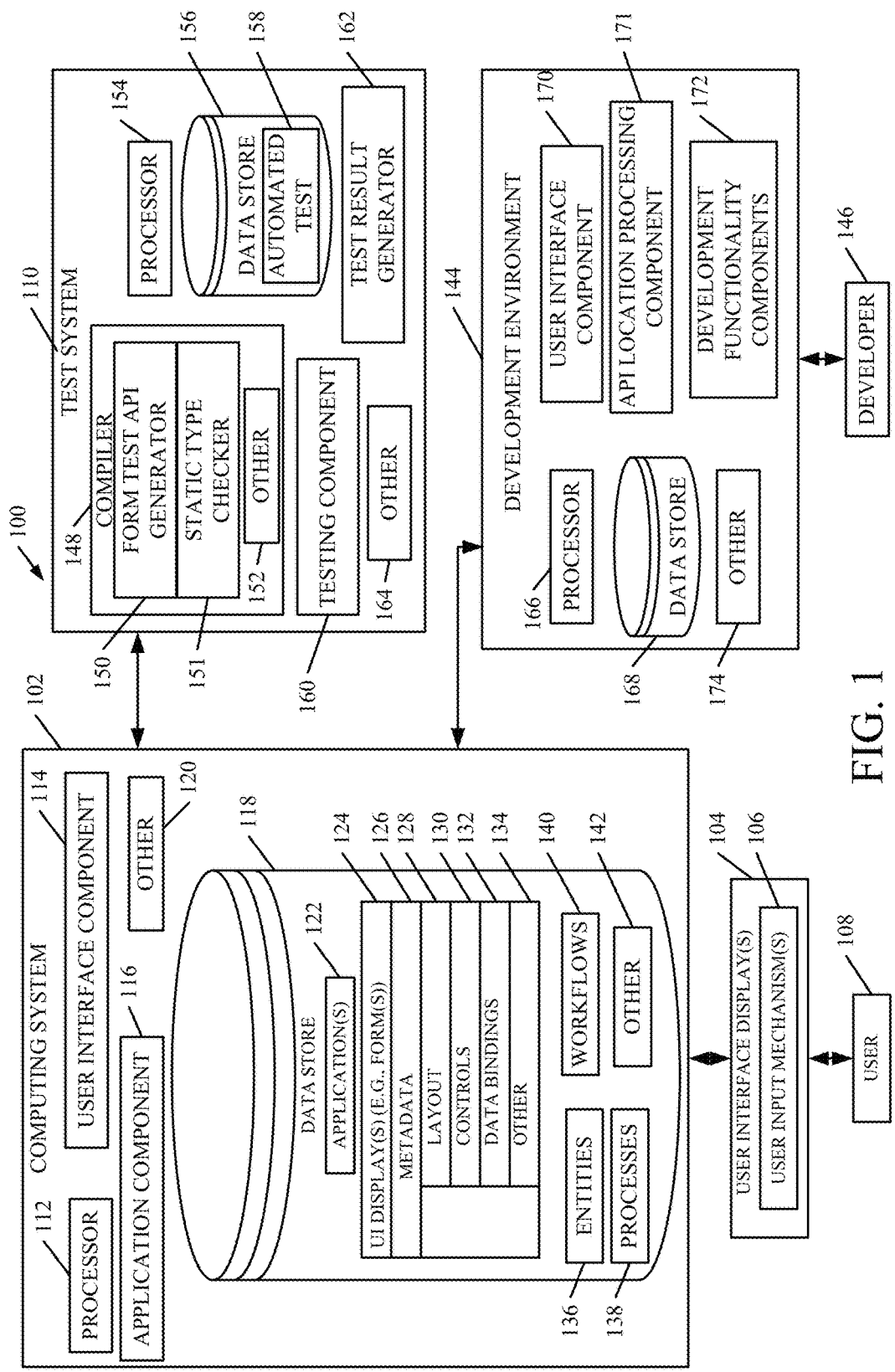
FIG. 1 is a block diagram of one example of a computing system architecture.

FIG. 1 is a block diagram of one example of a computing system architecture 100. Architecture 100 illustratively includes computing system 102 that, during runtime, generates user interface displays 104 with user input mechanisms 106 for interaction by user 108. User 108 illustratively interacts with user input mechanisms 106 in order to control and manipulate computing system 102.

In one example, computing system 102 includes processor 112, user interface component 114, application component 116, and data store 118. It can include other items 120 as well. Data store 118 illustratively includes applications 122, and user interface displays (such as forms) 124 which can be described by metadata 126. Metadata 126 can illustratively describe the layout 128, controls 130, data bindings 132 and other characteristics 134 of a given form. The forms are illustratively used to surface information from computing system 102 for user 108, as user interface displays 104. The controls 130 can comprise user input mechanisms 106 that can be interacted with by user 108 in order to control computing system 102.

Data store 118 can also include entities 136 which represent various items within the computing system, processes 138, workflows 140, and it can include other items 142. Application component 116 illustratively runs applications 122 to perform processes 138 and workflows 140, and to operate on entities 136, or other records. The applications 122 used to run the processes 138 and workflows 140 can take a wide variety of different forms. For example, they can be a wide variety of different types of business applications. They can also be electronic mail applications, document sharing applications, collaboration applications, calendaring applications, scheduling applications, or a wide variety of other types of applications.

Architecture 100 also illustratively includes development environment 144. Development environment 144 can be controlled and manipulated by a developer 146 in order to generate, modify, or otherwise develop applications 122, including forms 124, entities 136, processes 138, workflows 140 or other items deployed in computing system 102. Development environment 144 illustratively includes processor 166, data store 168, user interface component 170, API location processing component 171, development functionality components 172 and it can include other items 174.

Architecture 100 also illustratively includes test system 110 that can be used to test various portions of computing system 102. In the example shown in FIG. 1, test system 100 illustratively includes compiler 148 that, itself, illustratively includes form test application programming interface (API) generator 150, static type checker 151, and it can include other items 152. Test system 110 also illustratively includes processor 154, and data store 156, which can contain one or more automated tests 158 for testing computer system 102. System 110 also illustratively includes testing component 160, testing result generator 162 and it can include other items 164.

Before describing the overall operation of architecture 100 in more detail, a brief overview of some of the items in architecture 100, and their corresponding operation, will first be provided. Developer 146 illustratively interacts with development functionality components 172 in development environment 144 in order to develop applications 122. This can include adding, deleting or modifying entities, processes or workflows, authoring or extending those items, or a variety of other development activities. In doing so, developer 146 can discover APIs to be developed or modified using API location processing component 171. User interface component 170 illustratively generates developer interfaces that can be interacted with by developer 146 in order to develop computing system 102.

In order to test applications or other items in computing system 102, test system 110 first illustratively uses compiler 148 to compile the application under test. It can be one of applications 122, which includes forms 124, and which accesses entities 136 and runs processes 138 and/or workflows 140. In performing the compilation, test form API generator 150 illustratively accesses the metadata 126 for each of the forms in the application being tested. It generates a strongly typed test API for each of the forms. Testing component 160 illustratively accesses automated test 158 and programmatically interacts with the forms using the test APIs for those forms, based on test 158. Test result generator 162 generates and outputs the results of the test. They can be output to other processing systems for further processing, to users, developers, or other systems.

Figure 2:
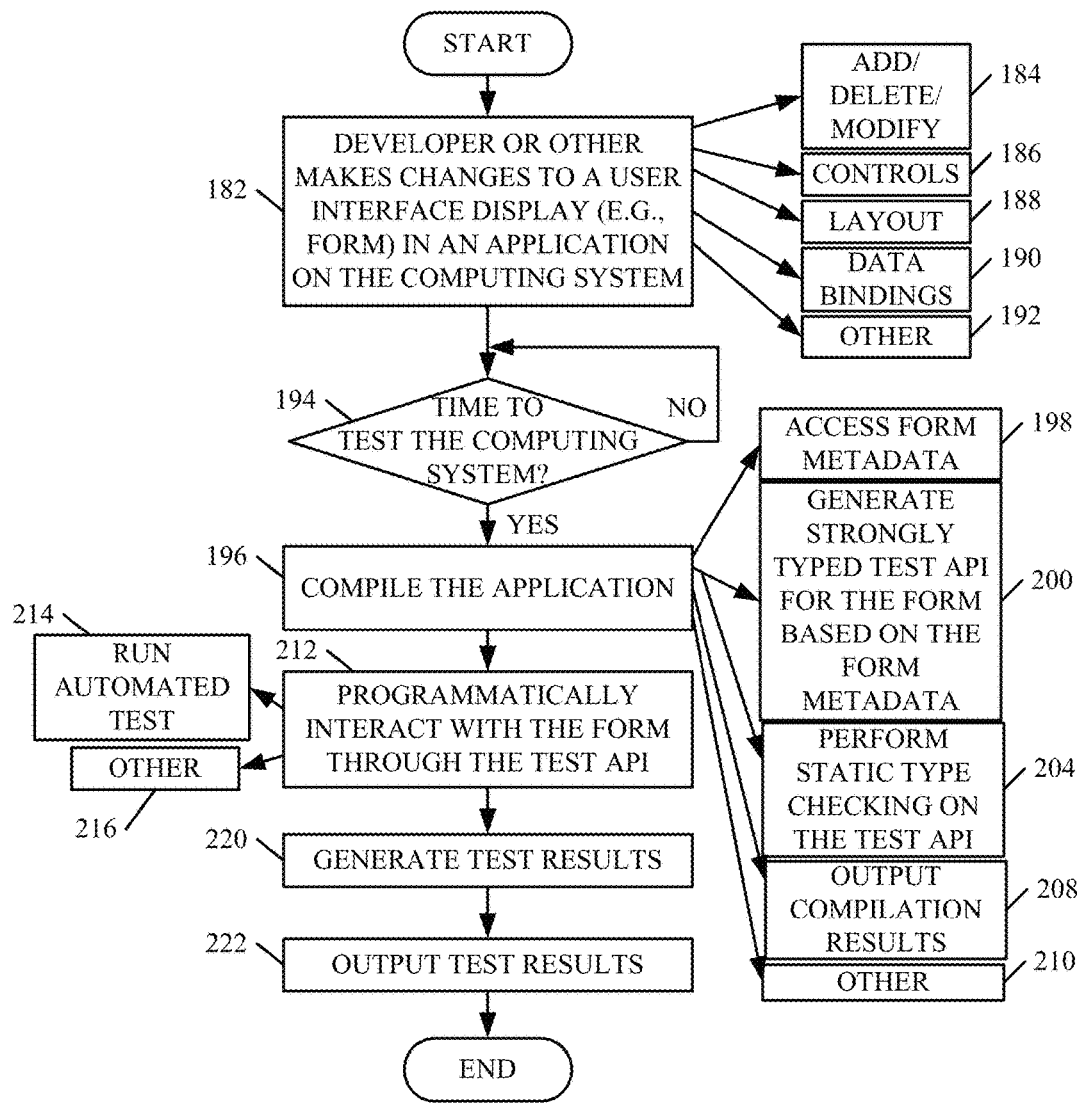
FIG. 2 is a flow diagram illustrating one example of the operation of a test interface generator in generating a strongly typed application programming interface from user interface display metadata, at compile time.
Figure 3:
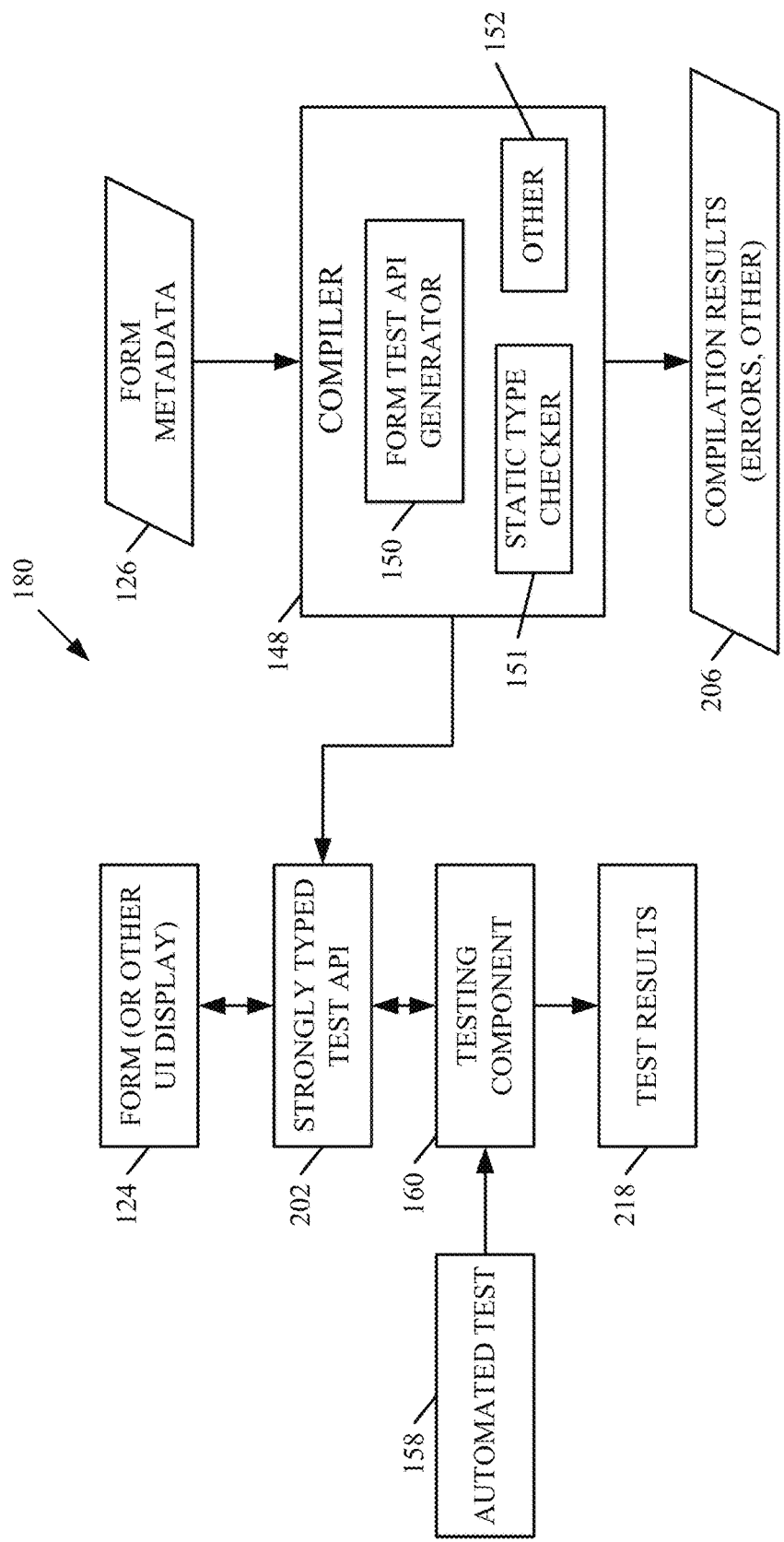
FIG. 3 is a block diagram of one example of a test system architecture.

FIG. 2 is a flow diagram illustrating one example of how test system 100 can be used to programmatically test the various forms 124 (or other user interface displays) that are used by computing system 102 during its runtime operation. FIG. 3 is a block diagram showing some of the items in FIG. 1, deployed in a testing architecture 180. FIGS. 2 and 3 will now be described in conjunction with one another.

It is first assumed that developer 146 has made some changes to a user interface display (e.g., a form 124) in an application 122 or another item that uses that form, on computing system 102. This is indicated by block 182. For instance, developer 146 can add, delete or modify items in computing system 102. This is indicated by block 184. The modifications can be made to controls, as indicated by block 186. They can be made to the layout of a form, as indicated by block 188. They can be made to the data bindings on the form, as indicated by block 190, or they can be made to other items on the form, as indicated by block 192. The metadata corresponding to the form is modified by the developer 146 to make such changes.

At some point, it will be time to test the application or other part of computing system 102, that uses the form that has been modified. This is indicated by block 194.

Developer 146 may wish to test the application at a variety of different times. When that time occurs, compiler 148 compiles the application containing changes to the form. It will be noted that the compilation step described below can be performed at a variety of different times. For instance, it can be performed when developer 146 makes changes to a form and saves those changes to computing system 102. It can also be made during a full build of computing system 102, or during any other time when compilation is invoked.

In any of these cases, compiler 148 illustratively compiles the application or other item that is to be tested. This is indicated by block 196. In doing so, form test API generator 150 illustratively accesses the form metadata 126 for the form (or forms) to be tested. This is indicated by block 198. Generator 150 then generates a strongly typed test API for that form, based upon the form metadata 126. This is indicated by block 200. The strongly typed test API is illustrated by block 202 in FIG. 3.

Because API 202 is strongly typed, static type checker 151 in compiler 148 illustratively performs static type checking on the test API in the application to be tested. This is indicated by block 204 in the flow diagram of FIG. 2. Compiler 148, when it has completed its compilation, outputs the compilation results 206 as compiled code. Results 206 can include compilation errors or other compilation results that can be provided to developer 146, another user, another computing system, etc. Outputting the compilation results is indicated by block 208 in the flow diagram of FIG. 2. Compiler 148 can also perform other steps, as indicated by block 210.

It is next assumed that the test API 202 has been generated and statically type checked and that no errors have occurred compilation. In that case, testing component 160 illustratively runs automated test 158 against the form 124, by accessing the strongly typed test API 202 for that form. This is indicated by block 212 in FIG. 2. Running the automated test is indicated by block 214. Testing component 160 can test the form 124 in other ways as well, this is indicated by block 216. As an example, testing component 160 can programmatically interact with the controls on form 124, through test API 202. It can programmatically interact with the form in other ways, through API 202, as well.

When the test is concluded, or intermittently during the test, test result generator 162 illustratively generates test results 218. Generating the test results is indicated by block 220 in FIG. 2. Test result generator 162 then outputs the test results, as indicated by block 222. The test results can be output to developer 146, or another user, computing system, etc.

Generating the strongly typed test API for the form (or other user interface display) during compilation provides a number of significant enhancements. First, because the test API is a strongly typed API, API location processing component 171 in development environment 144 can quickly and easily discover the API, and also a variety of characteristics of the API. For instance, the features implemented by component 171 can allow developer 146 to easily learn more about the code corresponding to the application under test, and specifically the forms in that application. It can allow developer 146 to keep track of parameters that he or she is typing and to add calls to properties and methods with only a relatively small number of keystrokes. It can implement a list members feature that allows the developer to obtain a list of valid members from a type when the developer types a trigger character. It can also include a parameter information feature that allows the developer to obtain information about the number, names and types of parameters required by a method, attribute, generic type parameter or template. It can allow the developer to obtain a complete declaration for any identifier, and it can perform word completions that complete the rest of a variable, command or function name, once the developer has entered enough characters to disambiguate the term. It can provide a variety of troubleshooting features as well. Of course, these are only examples of the various features that can be implemented by API location processing component 171, because the test API 202 is strongly typed.

This also makes the underlying system being tested much more extendible. For instance, a developer, independent software vendor (ISV), or other person may extend a form 124 (such as by adding a control). Then, as part of the compilation process, the test API will also reflect those modifications. By way of example, if an ISV adds a button to a form, then as part of the compilation process, the test API for that form will also have the newly added button.

Thus, as a developer, an ISV, or another extends the form, the test API will extend along with it so that the extended form can be fully tested.

In addition, because API generator 150 generates the test API as a strongly typed API, there will be no runtime type errors when the automated test is being run. For instance, if a developer deletes a button on the form, and the automated test attempts to interact with the deleted button, then because the API is strongly typed, this error will be detected at compile time. If the API were not strongly typed, then the application would still compile and it would fail when the test was run. This is because static type checking will be performed during compilation of the application, and this will include static type checking on the test API. Because the test API is generated during compilation, any of these types of control deletions or modifications, name-based changes, or other similar changes will be automatically detected at compile time. Further, when a developer, ISV, or other, makes a change to a UI element, the compiler knows the scope of the change. It can thus re-generate only the affected UI form, as opposed to re-generating the entire API. This allows changes to be processed very quickly, often within seconds of them being made.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
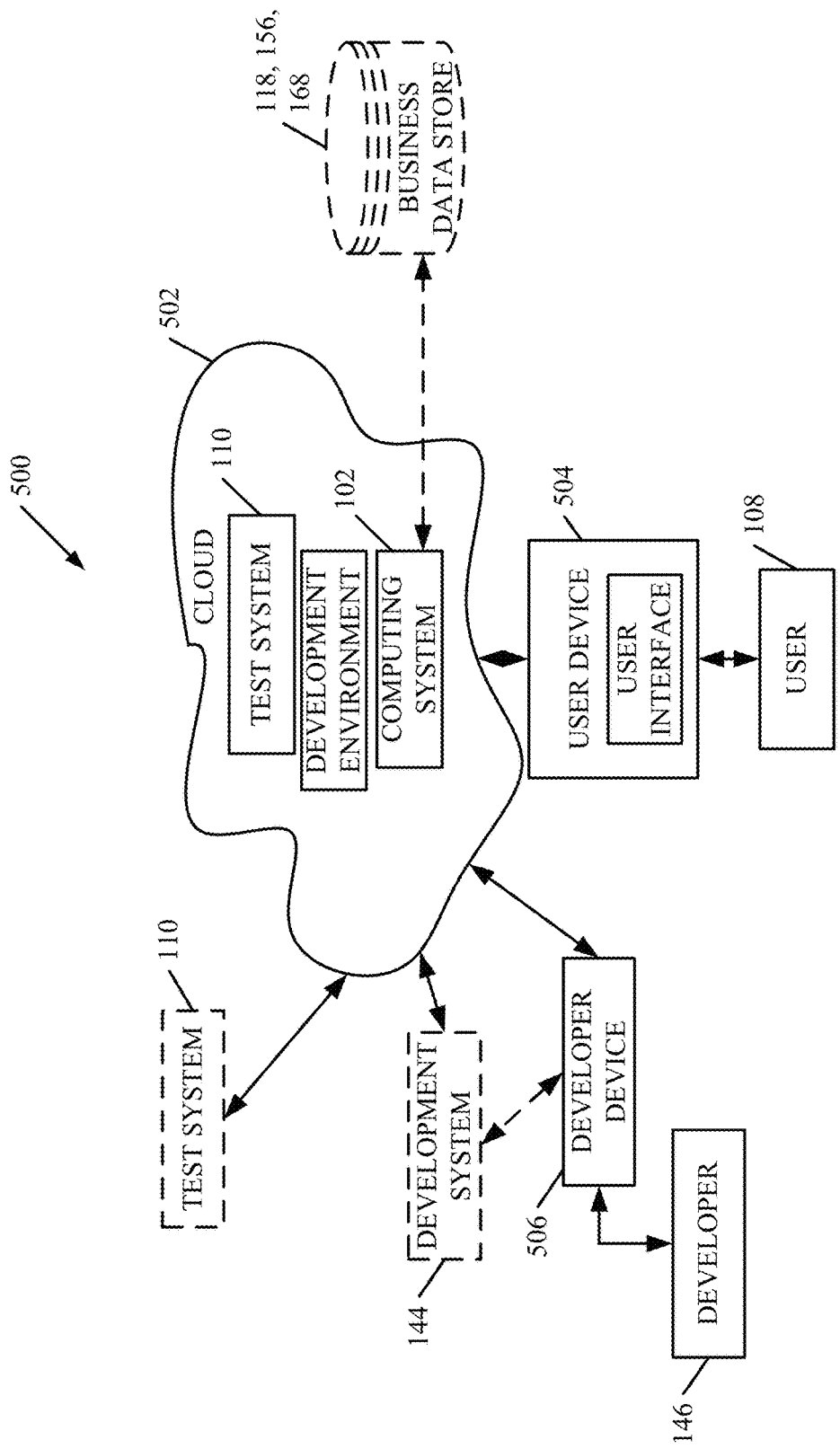
FIG. 4 is a block diagram showing one example of the architectures illustrated in FIGS. 1 and 3, deployed in a cloud computing architecture.

FIG. 4 is a block diagram of architecture 100 shown in FIG. 1, and testing architecture 180 shown in FIG. 3, except that the elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architectures 100 and 180 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102, test system 110 and development environment 144 can be located in cloud 502 (which can be public, private, or a combination where portions are public while others are private). Therefore, user 108 uses a user device 504, and developer 146 uses a developer device 506, to access those systems through cloud 502.

FIG. 4 also depicts another example of a cloud architecture. FIG. 4 shows that it is also contemplated that some elements of architectures 100 and 180 can be disposed in cloud 502 while others are not. By way of example, data stores 118, 156 and/or 168 can be disposed outside of cloud 502, and accessed through cloud 502. In another example, example, test system 110 or development environment 144 or other items can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architectures 100 or 180, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
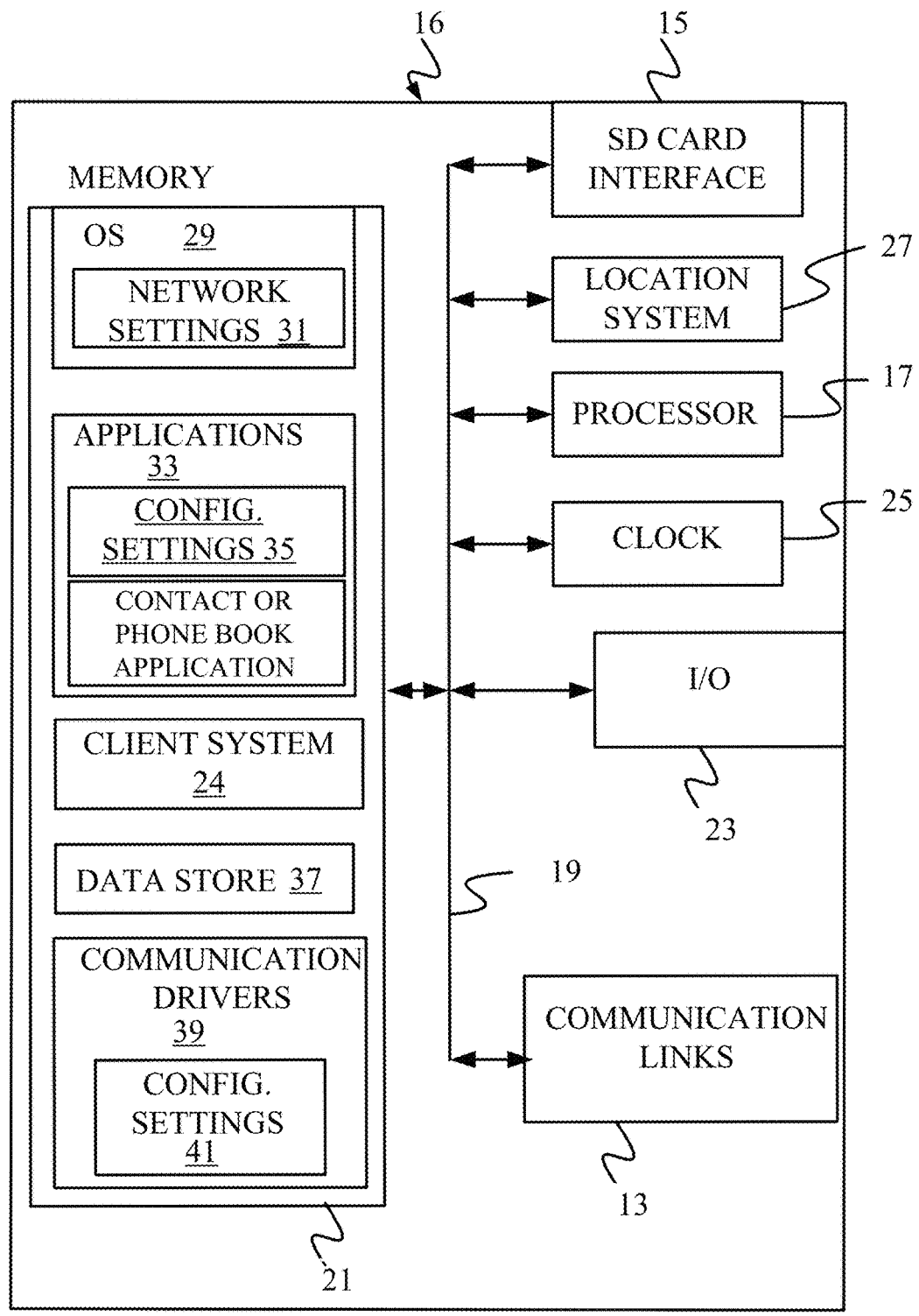
FIGS. 5-7 show examples of mobile devices that can be used in the architectures of FIGS. 1, 3 and 4.
Figure 6:
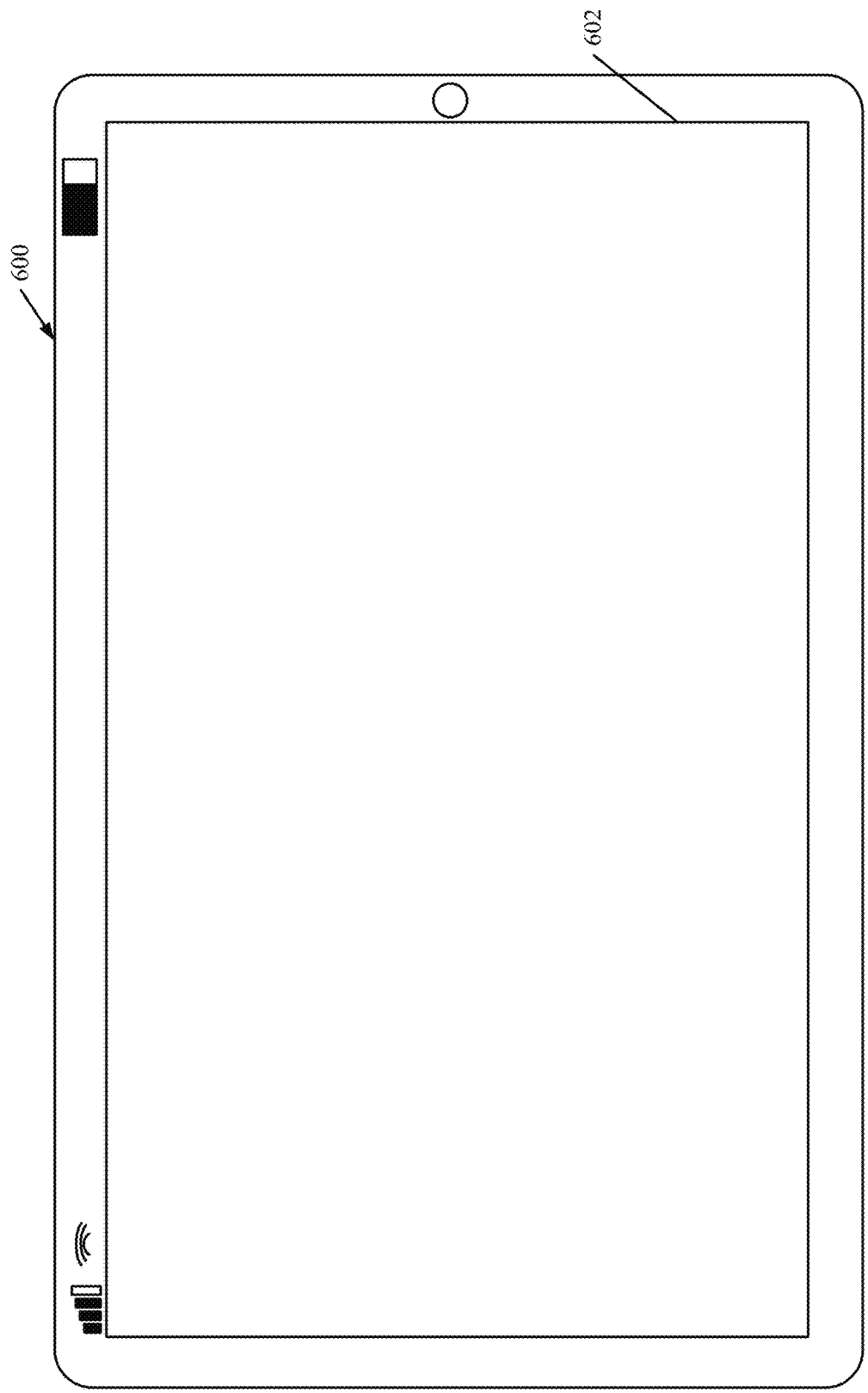
Figure 7:
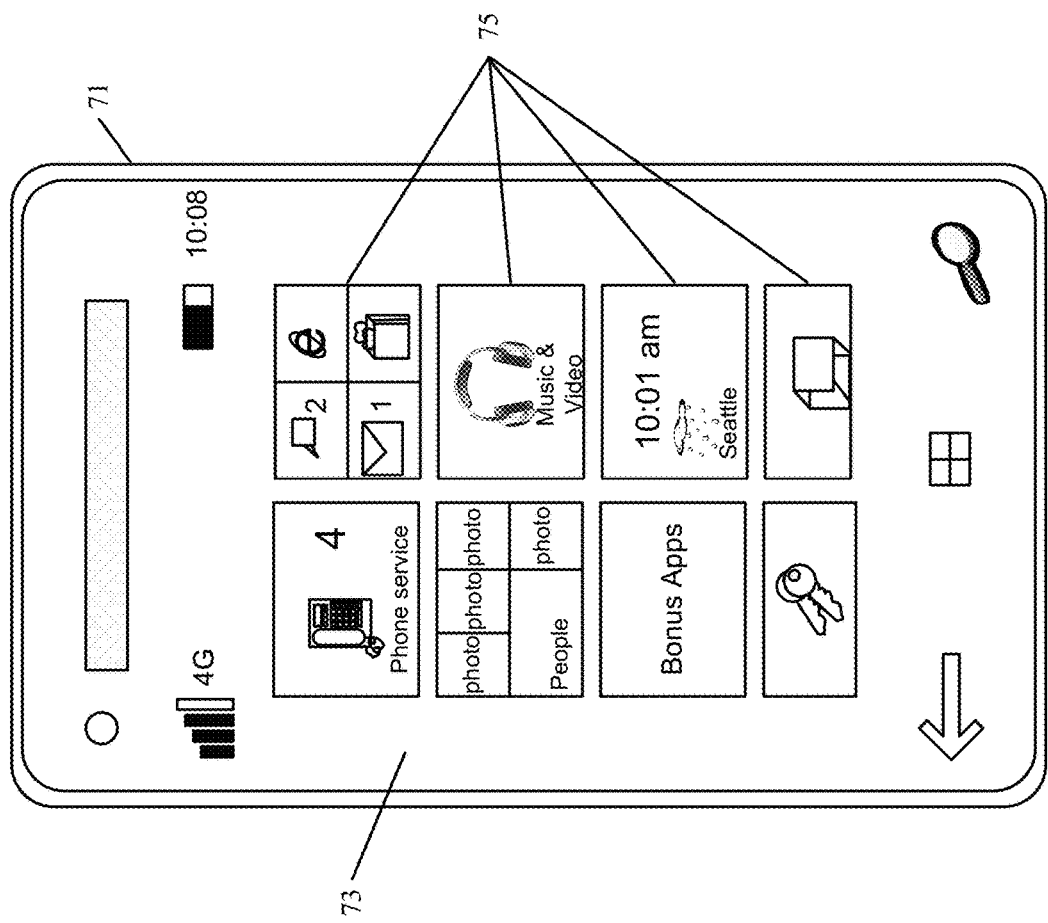

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architectures 100 or 180 or that interacts with architectures 100 or 180, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 112, 154 or 166 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various client applications or embody parts or all of architectures 100 or 180. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display 230 screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples, the phone also includes a Secure Digital (SD) card slot that accepts a SD card.

The mobile device can be a personal digital assistant, multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
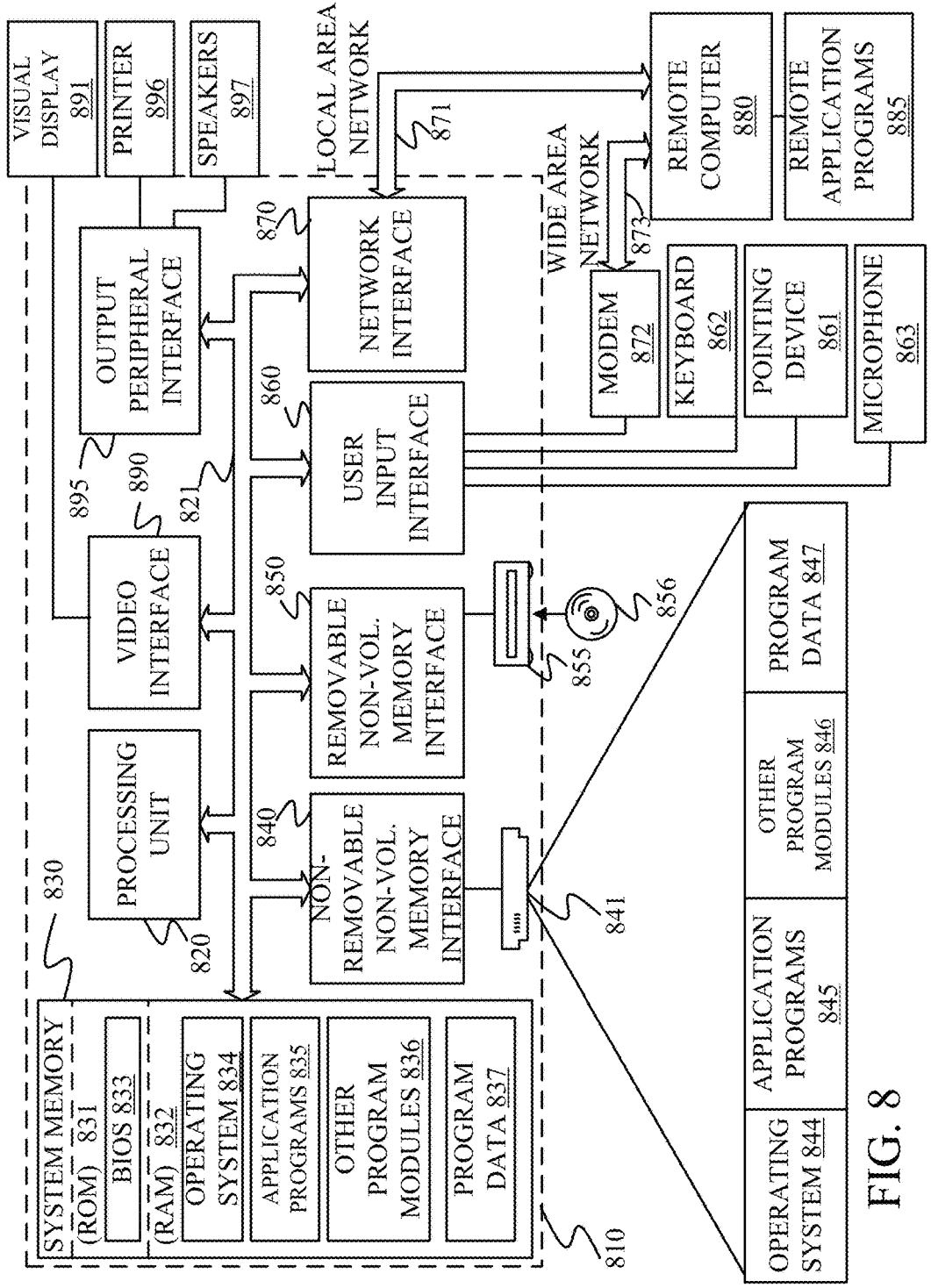
FIG. 8 is a block diagram of one example of a computing environment that can be deployed in any of the architectures described above.

FIG. 8 is one example of a computing environment in which architecture 100 or 180, or parts of them, (for example) can be deployed. With reference to FIG. 8, an example system for implementing some embodiments includes a general-purpose computing device in the form of a computer 810. Components of computer 810 may include, but are not limited to, a processing unit 820 (which can comprise processors 112, 154 or 166), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

An example includes a computing system, comprising:

a user interface (UI) test application programming interface (API) generator that accesses form metadata defining a user interface display in an application and automatically generates a strongly typed UI test API for the UI display based on the form metadata; and a testing component that programmatically interacts with the UI display through the strongly typed UI test API and outputs interaction results indicative of results of the programmatic interaction with the UI display.

Another example includes the computing system of any or all previous examples wherein the UI test API generator generates the strongly typed UI test API during compilation of the application.

Another example includes the computing system of any or all previous examples further comprising:

a static type checker that performs a static type check of the UI test API during compilation of the application and outputs type checking compilation results.

Another example includes the computing system of any or all previous examples wherein the form metadata defines controls on the UI display and wherein the UI test API generator generates the UI test API to interact with the controls.

Another example includes the computing system of any or all previous examples wherein the testing component programmatically interacts with the UI display by programmatically interacting with the controls on the UI display through the UI test API.

Another example includes the computing system of any or all previous examples wherein the testing component programmatically interacts with the UI display through the UI test API by accessing an automated test from a data store and by running the automated test and outputs the interaction results as test results of running the automated test.

Another example includes the computing system of any or all previous examples and further comprising:

a user interface component; and an API location component that detects developer location inputs and controls the user interface component to generate a location display indicative of a location of the UI test API.

Another example includes the computing system of any or all previous examples and further comprising:

a set of development functionality components that detect development inputs and generate metadata indicative of modifications to a given UI display in the application and wherein the UI test API generator automatically generates a given UI test API to test the modifications to the given UI display.

Another example includes a computer implemented method, comprising:

accesses form metadata defining a form that surfaces data in an application;

automatically generating a strongly typed form test application programming interface (API) for the form based on the form metadata;

programmatically interacting with the form through the strongly typed form test API; and controlling a user interface component to output interaction results indicative of results of the programmatic interaction with the form.

Another example includes the computer implemented method of any or all previous examples and further comprising:

compiling the application, wherein generating the strongly typed form test API is performed during compilation of the application.

Another example includes the computer implemented method of any or all previous examples and further comprising:

performing static type checking of the form test API during compilation of the application; and controlling the user interface component to surface type checking compilation results indicative of results of the static type checking.

Another example includes the computer implemented method of any or all previous examples wherein the form metadata defines controls on the form and wherein automatically generating the strongly typed form test API comprises":

automatically generating the form test API to interact with the controls.

Another example includes the computer implemented method of any or all previous examples wherein programmatically interacting with the form comprises:

programmatically interacting with the controls on the form through the form test API.

Another example includes the computer implemented method of any or all previous examples wherein programmatically interacting with the form through the form test API comprises:

accessing an automated test from a data store;

running the automated test; and controlling the user interface component to surface the interaction results as test results of running the automated test.

Another example includes the computer implemented method of any or all previous examples and further comprising:

detecting developer location inputs; and controlling the user interface component to generate a location display indicative of a location of the form test API.

Another example includes the computer implemented method of any or all previous examples and further comprising:

detecting development inputs;

generating metadata indicative of modifications to a given form in the application; and automatically generating a given form test API to test the modifications to the given UI form.

Another example includes a computing system, comprising:

a user interface (UI) test application programming interface (API) generator that accesses UI display metadata defining a user interface display in an application and automatically generates a strongly typed UI test API for the UI display based on the UI display metadata;

a compiler that compiles the application and includes a static type checker that performs static type checking on the UI test API; and a testing component that programmatically interacts with the UI display through the strongly typed UI test API and outputs interaction results indicative of results of the programmatic interaction with the UI display.

Another example includes the computing system of any or all previous examples wherein the form metadata defines controls on the UI display and wherein the UI test API generator generates the UI test API to interact with the controls and wherein the testing component programmatically interacts with the UI display by accessing an automated test from a data store and programmatically interacting with the controls on the UI display through the UI test API by running the automated test.

Another example includes the computing system of any or all previous examples and further comprising:

a user interface component; and an API location component that detects developer location inputs and controls the user interface component to generate a location display indicative of a location of the UI test API.

Another example includes the computing system of any or all previous examples and further comprising:

a set of development functionality components that detects development inputs and generates metadata indicative of modifications to a given UI display in the application and wherein the UI test API generator automatically generates a given UI test API to test the modifications to the given UI display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

a processor;

memory containing instructions that, when executed by the processor, provide a user interface test application programming interface (API) generator and a testing component;

the user interface (UI) test application programming interface (API) generator being configured to access form metadata defining user interface displays in an application and automatically generate, during compilation of the application, a strongly typed UI test API for each UI display based on the form metadata;

a static type checker that performs a static type check of each UI test API during compilation of the application and outputs type checking compilation results; and wherein the testing component is configured to programmatically interact with the UI displays through each respective strongly typed UI test API and output an interaction result indicative of a result of the programmatic interaction with each UI display.

2. The computing system of claim 1 wherein the form metadata defines a control on one of the UI displays and wherein the UI test API generator generates the UI test API to interact with the control.

3. The computing system of claim 2 wherein the testing component programmatically interacts with the UI display by programmatically interacting with the control on the UI display through the UI test API.

4. The computing system of claim 3 wherein the testing component is configured to programmatically interact with the UI display through the UI test API by accessing an automated test from a data store and by running the automated test and providing the interaction result as a test result of running the automated test.

5. The computing system of claim 4 and further comprising:

a user interface component; and an API location component that detects a developer location input and controls the user interface component to generate a location display indicative of a location of each UI test API.

6. The computing system of claim 5 and further comprising:

a development functionality component that detects a development input and generates metadata indicative of a modification to a UI display in the application and wherein the UI test API generator automatically generates a UI test API to test the modification to the UI display.

7. A computer implemented method, comprising:

accessing form metadata defining a plurality of forms that surface data in an application;

automatically generating a strongly typed form test application programming interface (API) for each form based on the form metadata;

programmatically interacting with each form through each strongly typed form test API;

controlling a user interface component to output interaction results indicative of results of the programmatic interaction with the forms; and compiling the application, wherein generating each strongly typed form test API is performed during compilation of the application.

8. The computer implemented method of claim 7 and further comprising:

performing static type checking of each form test API during compilation of the application; and controlling the user interface component to surface type checking compilation results indicative of results of the static type checking.

9. The computer implemented method of claim 8 wherein the form metadata defines controls on a form and wherein automatically generating each strongly typed form test API comprises:

automatically generating a form test API to interact with the controls.

10. The computer implemented method of claim 9 wherein programmatically interacting with the form comprises:

programmatically interacting with the controls on the form through the form test API.

11. The computer implemented method of claim 10 wherein programmatically interacting with the form through the form test API comprises:

accessing an automated test from a data store;

running the automated test; and controlling the user interface component to surface the interaction results as test results of running the automated test.

12. The computer implemented method of claim 11 and further comprising:

detecting developer location inputs; and controlling the user interface component to generate a location display indicative of a location of each form test API.

13. The computer implemented method of claim 12 and further comprising:

detecting development inputs;

generating metadata indicative of modifications to a given form in the application; and automatically generating a given form test API to test the modifications to the modified UI form.

14. A computing system, comprising:

a processor;

memory containing instructions that, when executed by the processor, provide a user interface test application programming interface (API) generator, a compiler, and a testing component;

the user interface (UI) test application programming interface (API) generator being configured to access UI display metadata defining a user interface display in an application having a plurality of forms and automatically generate a strongly typed UI test API for each form based on the UI display metadata;

the compiler being configured to compile the application and include a static type checker that performs static type checking on the UI test API; and the testing component being configured to programmatically interact with the UI display through the strongly typed UI test API and output an interaction result indicative of results of the programmatic interaction with the UI display.

15. The computing system of claim 14 wherein the form metadata defines a control on the UI display and wherein the UI test API generator generates the UI test API to interact with the control and wherein the testing component programmatically interacts with the UI display by accessing an automated test from a data store and programmatically interacting with the control on the UI display through the UI test API by running the automated test.

16. The computing system of claim 15 and further comprising:

a user interface component; and an API location component that detects developer location inputs and controls the user interface component to generate a location display indicative of a location of the UI test API.

17. The computing system of claim 16 and further comprising:

a development functionality component that detects a development input and generates metadata indicative of a modification to a UI display in the application and wherein the UI test API generator automatically generates a UI test API to test the modification to the UI display.

* * * * *